United States Patent Office 3,314,066
Patented Apr. 11, 1967

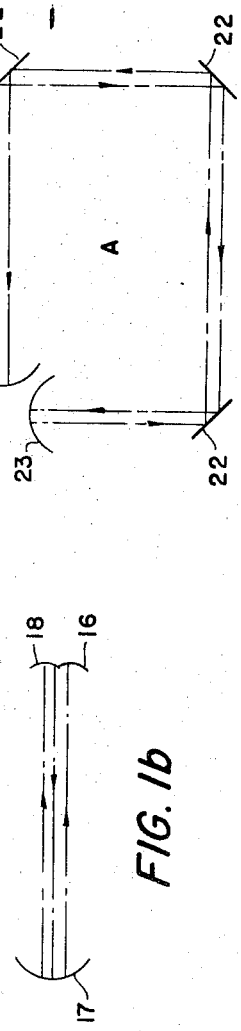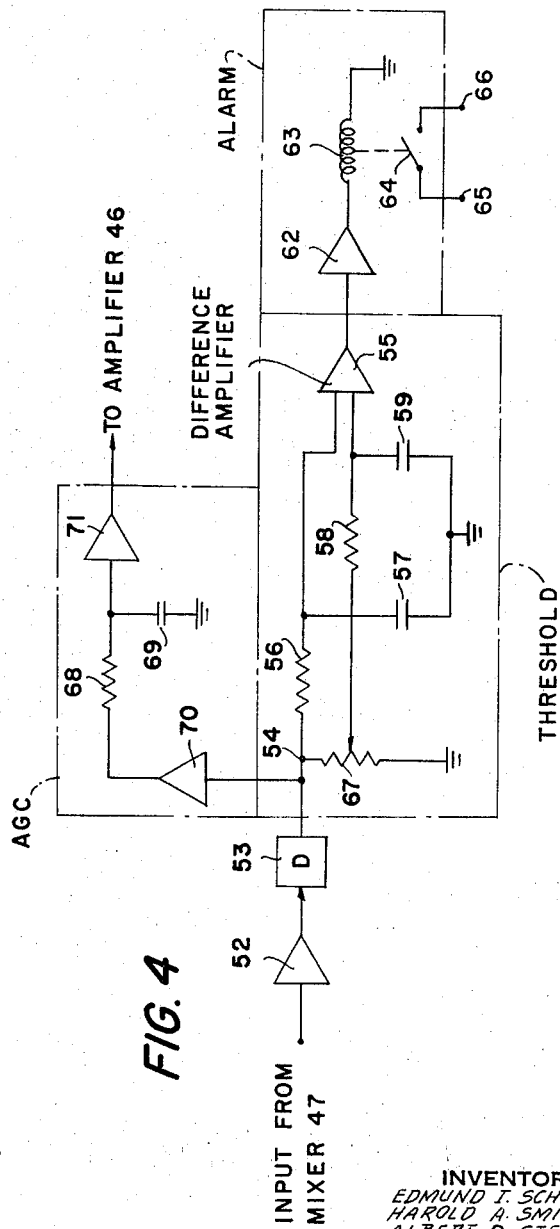

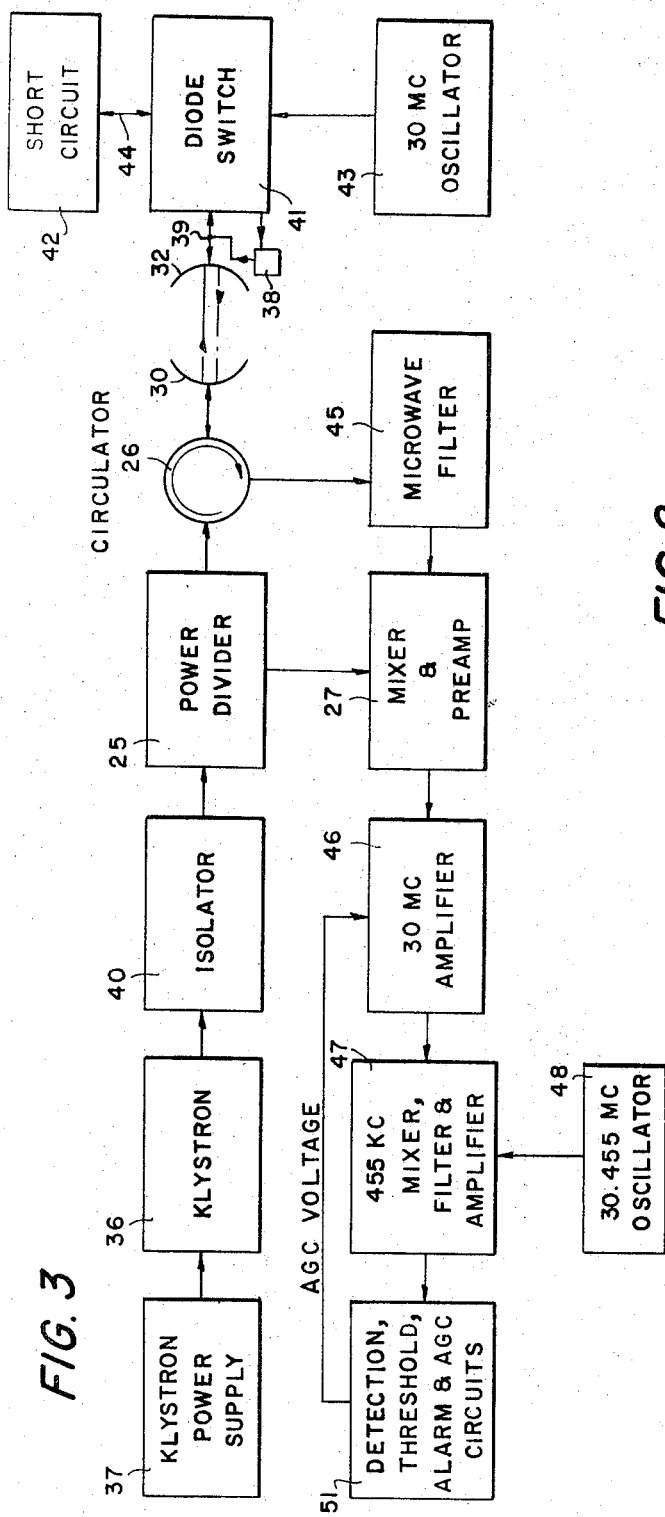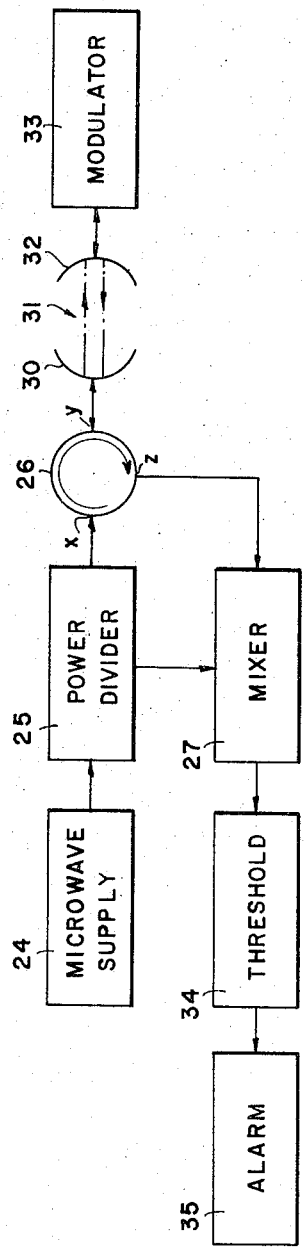

3,314,066
METHOD AND APPARATUS FOR DETECTING THE ENTRANCE OF AN OBJECT INTO A REGION BEING MONITORED
Edmund I. Schwartz, Fairlawn, and Harold A. Smith, Plainfield, N.J., and Albert D. Stern, Jamaica, N.Y., assignors to Devenco Incorporated, New York, N.Y., a corporation of New York
Filed June 2, 1965, Ser. No. 460,686
9 Claims. (Cl. 343—5)

This invention relates to a system for detecting the entrance of an object into a region being monitored by the system, and more particularly to an electronic system of such character which introduces an electromagnetic wave into the region and detects disturbances of the wave. Coordinately, the invention relates to a detection method.

Systems of the general type to which this invention relates are well known, and include, for example, the popular "electric eye" devices. In these systems, an energy wave of some type is directed from a transmitter or source through the region being monitored to a receiver. The receiver is adapted to detect changes in the amount of energy reaching it, so that if the energy wave is disturbed by the entrance of an object into the region, the disturbance is detected by the receiver and thereupon causes some desired function to occur by means of an electric circuit connected to the receiver.

Certain problems and limitations are inherent in systems of the type described which are now available. For example, "electric eye" devices employ a beam of light as the energy wave. Consequently, such a device cannot be used where the absence of light is desirable, or where inclement weather will disturb the light beam sufficiently to cause "false alarms." Furthermore, the beam of light used in such devices is collimated and hence leaves the region directly above and below the beam unmonitored. In contrast, other types of energy waves spread too much between transmitter and receiver, and hence it is difficult to build a practical system employing such waves since if the transmitter and receiver are separated by a considerable distance only a relatively small amount of energy reaches the receiver for a given energy input to the system. Still other types of known systems, such as those which depend for their efficacy on the so-called Doppler shift, are sensitive to movements of objects outside the region being monitored, whereby the receiver misinterprets such movements as entrances into the region and consequently produces "false alarms."

It is an object of the present invention to provide a method and system of the type described which is highly sensitive to objects entering the region being monitored, but almost completely insensitive to movements outside the region.

It is another object of the invention to provide such a system which is thoroughly practical from the points of view of power requirements and size of components.

It is another object of the invention to provide such a system which is easily transported and can be readily set up without the need for complex installation procedures.

It is a further object of the invention to provide a system admirably suited to monitor the perimeter of any selected area and detect objects crossing the perimeter.

In carrying out these objectives, the present invention employs a transmitter at one extremity of the region being monitored for sending an energy wave, preferably a microwave, through the region, a reflector at another extremity of the region for reflecting the wave back through the region along substantially the same path traveled during its initial propagation, and a receiver arranged to receive the reflected wave. As a result of this arrangement, employing a wave reflected one or more times through the region, the present system is much more sensitive to disturbances caused by objects entering the region than is a "one-way" system, wherein the wave travels only once through the region. The reason for this is that the energy wave whose intensity is being measured at the receiver is intercepted twice by the object entering the region, i.e. the wave is disturbed during its initial propagation and then the reflected wave is disturbed, thus yielding a change in intensity of the wave at the receiver proportional to the square of the change in intensity due to disturbance of the initially propagated wave. In contrast, the energy wave of a "one-way" system is disturbed only once by an object entering the region.

Furthermore, the present invention contemplates modulating the energy wave impinging upon the reflector, or target, so that the reflected wave includes modulation energy, and measuring at the receiver only the modulation energy of the reflected wave. Consequently, the system is almost completely insensitive to spurious reflections, i.e. reflections from objects outside the region being monitored. The reason for this is that if such objects happen to reflect the energy wave back toward the receiver, this reflected wave will not include modulation energy at the same frequencies as that of the modulation energy produced at the target. Since the measuring means at the receiver is adapted to measure modulation energy at only the frequency or frequencies produced at the target, the measuring means will not measure the spurious reflections.

A feature of the invention resides in the provision of a unique threshold means, associated with the receiver, which produces a signal in response to any change in the energy level of the wave reaching the receiver.

Other objects and advantages of the invention will be found in the following detailed description of the invention, in which reference is made to the accompanying drawings.

In the drawings:
FIGS. 1a, b, and c illustrate typical transmitter-reflector-receiver arrangements according to the present invention;
FIG. 2 is a simplified block diagram of a detection system according to this invention;
FIG. 3 is a more detailed block diagram of the illustrative system; and
FIG. 4 is a schematic diagram of a portion of FIG. 3 illustrating a detector, threshold means, automatic gain control means, and an alarm circuit.

In the present specification and the claims which follow, reference to "disturbance" of an energy wave is intended to encompass the terms: absorption, reflection, defraction, and scattering. Furthermore, use of the term "object" to describe what is detected by the present system is intended to broadly describe any and all objects, animate or inanimate, and obviously encompasses people within its scope. The general arrangement of a system according to the present invention is shown in simplest form in FIG. 1a. A microwave transmitter and receiver are located at a station 10, at one extremity of the region to be monitored. The station 10 is represented by a parabolic antenna 11. A single antenna may be employed as part fo both the transmitter and receiver, or if preferred, two independent antennas may be located side-by-side. Microwave energy is transmitted through the region being monitored, along a path indicated by the dot-dash line 12, to a second station 13 at another extremity of the region. The station 13 is represented by a reflector or target antenna 14. The microwave energy is reflected back through the region, along a path indicated by the dot-dash line 15, to the antenna 11, whereby it reaches the receiver at station 10.

In the present description, the energy wave, for the sake of illustration, will be referred to as "microwave" energy. However, it is to be understood that the invention is not limited to energy waves within any particular frequency range, but rather is useful with radiation of any kind.

Should an object enter the region between the stations 10 and 13, it will disturb the energy wave being propagated along the path 12, and hence the amount of energy reaching the antenna 14 will be altered. Usually this alteration is a reduction in the amount of energy reaching the antenna 14. Since the amount of energy reaching the antenna 14 is changed, say reduced, the intensity of the energy reflected back along path 15 is reduced. When the reflected energy wave encounters the object which has entered the region, the wave is disturbed and hence its intensity is altered, say reduced. Consequently, the intnsity of the reflected wave reaching the antenna 11, and hence the receiver, is less than the intensity the reflected wave would have if it had not been disturbed.

It will be appreciated, therefore, that by virtue of the step of reflecting the energy wave through the region along substantially the same path traveled by the initially propagated wave, an object entering the region disturbs the energy wave at a number of points along its length and thereby causes successive alterations in the intensity of the wave which affect the intensity exponentially. Thus, in a system providing a single reflection, such as that shown in FIG. 1a, entrance of an object into the region between stations 10 and 13 causes a change in intensity of the wave proportional to the square of the change in intensity caused by the disturbance of the transmitted wave traveling along the path 12. Thus, the present system is much more sensitive to intrusions into the region being monitored than is a "one-way" system employing no reflections. In a system involving two reflections, such as is illustrated in FIG. 1b, an object entering the region being monitored causes a change in intensity of the wave reaching the receiver antenna 16 proportional to the cube of the change in intensity caused by disturbance of the unreflected wave initially transmitted from the antenna 17. In the system of FIG. 1b, the energy wave is transmitted from antenna 17 to an antenna 18 which reflects the wave back to the antenna 17 which in turn reflects the wave to antenna 16. The latter antenna is arranged adjacent to the antenna 18 and has the receiving means associated with it.

A system according to the present invention can be employed to monitor the entire perimeter of an area, and an arrangement for this purpose is shown in FIG. 1c in which the perimeter of an area designated A is monitored. The path of the energy wave transmitted from antenna 21 is altered by suitably arranged reflectors 22, which may be plane metallic surfaces, the energy wave eventually impinging upon the antenna 23. The antenna 23 reflects the wave back along substantially the same path traveled initially until it reaches the antenna 21 with which the receiver is associated. The antennas 21 and 23 are of course completely analogous to the antennas 11 and 14 of FIG. 1a. Consequently, any object crossing the perimeter of area A will cause a change in the intensity of the energy wave reaching the receiver.

A feature of the present invention involves modulating the energy wave at the time it is reflected by the antenna 14 (or 18, or 23), and when a modulating means is associated with these reflecting antennas the combination will be referred to as a "target." The way in which a modulated wave is employed, according to the invention, will be discussed in more detail below.

The general mode of operation of a detection system chosen to illustrate the present invention will be described in connection with FIG. 2. Microwave energy at some predetermined frequency is supplied by a suitable conventional supply source 24 to a power divider 25. Most of the energy reaching the power divider is transmitted to a circulator 26 of conventional design, but a small percentage of the energy is routed by the power divider to a mixer 27. From the circulator 26, the energy is directed to an antenna 30 for transmission through the region 31 being monitored to a target antenna 32. A circulator, as is well known, is a three port device. Ideally, all the energy entering the device at a first port, marked x in FIG. 2, leaves through a second port y, and all the energy entering at the second port y leaves through a third port z. The purpose of the circulator 26 in the present illustration is to permit the same antenna 30 to serve as both a transmitting and a receiving antenna. If two independent antennas are used for this purpose, the circulator would be eliminated and energy from the power divider would be transmitted directly to the antenna 30.

The energy striking the antenna 32, which has a carrier frequency equal of course to the frequency of the source 24, is directed to a modulating means 33 whereby it is modulated. Thus, the energy wave reflected back toward the antenna 30 by the antenna 32 includes modulation energy, i.e. energy at certain sideband frequencies, in addition to energy at the carrier frequency. The reflected energy wave is directed through the ports y and z of the circulator 26 to the mixer 27. If separate antennas were used to transmit and receive, instead of the single antenna 30, the reflected energy wave would be transmitted directly from the receiving antenna to the mixer since the circulator would not be present. In the mixer 27, the reflected energy is mixed with energy from the power divider, the latter energy being at the frequency of the source, i.e. the carrier frequency. The result of this mixing process is a signal proportional to the modulation energy of the reflected wave. This signal is fed to a threshold means 34 capable of determining whether or not the intensity of the signal has changed from a predetermined or "steady state" value. If such a change is detected, a signal is transmitted to an alarm 35 of any desired character.

It will be seen that by virtue of the mixer 27 and threshold means 34, changes in only the modulation energy of the reflected wave will actuate the alarm 35. Therefore, spurious reflections, i.e. reflections of the transmitted energy wave from objects outside the region 31 will not affect the alarm since it is highly unlikely that such reflected energy will have the frequency of the modulation energy. Thus, only objects which actually enter the region 31 and disturb the energy waves will cause a change in the value of the signal leaving the mixer 27.

The illustrative embodiment of this invention will be described in more detail with reference to FIG. 3. It might be mentioned here that the components of the system, shown in FIGS. 2 and 3, which handle microwave energy are obviously interconnected by means of conventional wave guides ordinarily used to transmit microwave energy. The microwave source comprises a klystron 36, i.e. a very high frequency oscillator, supplied with a highly constant D.C. voltage by a klystron power supply 37. For purposes of illustration, assume that the energy emanating from the klystron has a frequency of 10,000 megacycles per second (mc.). The high frequency energy is directed through an isolator 40 to a power divider 25, the function of which was described in connection with FIG. 2. It might be mentioned that in the present example, less than 1% of the energy received by the power divider 25 is directed to the mixer 27, the balance being directed to the circulator 26. The isolator 40 is a well known device which passes energy from the klystron 36 to the power divider 25, but does not pass energy in the opposite direction. Thus, the power level or frequency of the klystron cannot be affected by any reflected energy or variations in the characteristics of the balance of the system.

As described above, the energy wave is carried from the circulator 26 to the antenna 30 by means of which it is transmitted through the region being monitored to the target antenna 32. The illustrative means selected to modulate the energy impinging upon the antenna 32 is a diode switch 41 provided with a short circuit 42. Diode switches, as such, are well known and are described on pages 12–14, of the December 1963 issue of Special Report on Electronics, published by The Chariot Publishing Co. of Stamford, Conn. This publication also describes the manner in which diode switches may be used to modulate microwave energy. Briefly stated, the diode switch is connected to an oscillator 43 which, at a rapid rate, constantly changes or switches the state of the diode between forward bias and reverse bias. Connected to the diode switch is a length of wave guide 44 having a short circuit, i.e. a cover, at its free end. Due to the switching of the diode 41, microwave energy impinging upon the antenna 32 is alternately blocked by the diode switch (when the switch is open, i.e. nonconducting) and passed by the switch (when the switch is closed, i.e. conducting) to the short circuit. Thus the energy is reflected back to the antenna 32 either by the diode switch or by the short circuit. In this way, the microwave energy is phase modulated, since the length of the wave guide 44 introduces a phase shift in the reflected microwave energy each time the diode switch changes its state. In the present example, a 30 mc. oscillator 43 is used, hence the phase shift takes place 30 million times per second. Obviously, other types of modulation may be employed, but for the purposes of this invention, phase modulation has been found simplest and most efficient. If desired, the energy reaching the target may be amplified, such as by an amplifier 38, before being reflected by the target antenna 32 back to the antenna 30. This will usually be done where the antennas 30 and 32 are spaced very far apart. If amplifier 38 is employed, a circulator (not shown) would be provided at point 39.

As is well known, when a characteristic of an energy wave, such as its phase, is changed at regular intervals, i.e. when a wave is modulated, the result is a wave having energy at its original, or carrier, frequency, and modulation energy at sideband frequencies which differ from the carrier frequency by an amount equal to the frequency of the change. Thus, in the present example, the energy wave reflected back to the antenna 30 by the antenna 32 contains energy at the carrier frequency (10,000 mc.), and modulation energy, the great majority of which appears at two sideband frequencies appearing on either side of the carrier frequency. These sideband frequencies are 10,030 mc. and 9,970 mc.

The reflected energy is directed to a microwave filter 45 tuned to pass energy at only one of the sideband frequencies, say 10,030 mc. Thus, energy at both the carrier frequency and at the other sideband frequency is filtered out. The purpose of filtering out modulation energy at one of the sideband frequencies is to make the system insensitive to slight variations which may occur in the distance between the antennas 30 and 32 as a result of movement of the antennas due to wind, vibrations, or other causes. Since the wave length of the energy is so short (about three centimeters), even moderate movement of the antennas can affect the phase of the reflected energy reaching the antenna 30 to such an extent that the energies at the two sideband frequencies might cancel each other. Although such cancellation could be prevented by precise spacing between the antennas and expensive and cumbersome mounting of the antennas in an absolutely rigid manner, the use of the filter 45 avoids the problem in a simple and economical way.

The modulation energy passed by the filter 45 enters the mixer 27, which may have a preamplifier associated with it, wherein it is mixed with the sample of energy at the carrier frequency with the result that the signal leaving the mixer has a frequency equal to the difference between the carrier frequency of the sideband frequency, or in the present example 30 mc. The 30 mc. signal is amplified by an amplifier 46, and the amplified signal delivered to a super heterodyne circuit comprising generally a mixer 47 and an oscillator 48. The oscillator 48, in the present illustration, supplies a signal to the mixer 47 at a frequency 445 kilocycles per second (kc.) higher than the frequency of the signal reaching the mixer from the amplifier 46. Consequently, the output of the mixer 47 is a signal having a frequency of 445 kc. Means for filtering and amplifying this signal may be associated with the mixer 47. The 445 kc. signal is applied to a group of circuits indicated by the box labeled 51 in FIG. 3. These circuits are identified as the detection, threshold, alarm, and automatic gain control (AGC) circuits, and will now be described in detail with reference to FIG. 4.

The 445 kc. signal from mixed 47 is amplified, in the present example, to a level of about 5 volts by amplifier 52, and is then passed through a detector 53 to convert it to D.C. The signal from detector 53 is conducted to a threshold means comprising two time constant circuits connected in parallel between a terminal 54 and an amplifier 55. The two time constant circuits have different time constants. The short time constant path is provided by resistor 56 and capacitor 57, while the long time constant path is provided by resistor 58 and capacitor 59. Under steady state conditions, i.e. when there is no disturbance of the energy wave in the region between the antennas 30 and 32, the signals flowing in both time constant circuits are equal. Hence, the resultant signal applied to the amplifier 55 is zero, assuming that the two time constant circuits are connected with opposite polarities to the amplifier. However, when an object enters the region being monitored and disturbs the energy wave, the value of the signal leaving the mixer 47 will change and so a momentary difference will develop between the values of the signals in the two time constant circuits. This of course is due to the fact that the signal flowing in the short time constant circuit responds more quickly to the change in the signal reaching the terminal 54 than does the signal flowing in the long time constant circuit. The amplifier 55 senses this difference and produces a signal which flows to the alarm circuit. This signal, which may be amplified at 62, serves to energize a relay coil 63 and causes relay contacts 64 to close. Thus, an appropriate alarm device (not shown) connected to the terminals 65 and 66 will be energized.

In the alternative, a reference voltage may be applied to the amplifier 55 from a source not shown, which under steady state conditions serves to maintain the relay coil 63 energized. In this case, the alarm will be so connected that it remains unactuated as long as the relay coil is energized. When a difference between the signals in the time constant circuit develops, the resultant signal will counteract the reference voltage and cause the relay coil 63 to be deenergized whereupon the alarm will be actuated. This is a "fail safe" type of arrangement since if the power supply to the system fails, the relay coil will be deenergized and the alarm actuated.

A variable resistor 67 in the long time constant circuit serves to attenuate the signal in this circuit and hence determines the amount of change necessary in the output of the mixer 47 to cause a signal of sufficient magnitude for actuating the relay 63 to be applied to the amplifier 55.

The signal from detector 53 is also conducted to an automatic gain control (AGC) circuit including a time constant circuit comprising a resistor 68 and a capacitor 69. The output of the AGC circuit, which may include amplifiers 70 and 71, is applied to the amplifier 46 (see FIG. 3) in order to control the gain of this amplifier. The AGC circuit serves to vary the gain of amplifier 46 on a long range basis in order to compensate for slowly changing variations in the strength of the signal reaching the amplifier 46 due, for example, to reduction of the power output of the klystron as a result of aging. In this way, the output of the amplifier, under steady state conditions, is maintained constant. However, the time constant circuit of the AGC has a time constant at least as long and prefereably much longer than the time constant of the long time constant circuit of the threshold so that the AGC does not compensate for reductions in the signal strength reaching the amplifier 46 caused by disturbances of the energy wave in the region being monitored.

An example of the effectiveness of a system according to this invention is the following: when a 10,000 mc. energy wave is used with two 24 inch parabolic antennas, a person entering the region between the antennas can be detected with the antennas spaced 600 feet or more apart.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A system for detecting the entrance of an object into a region being monitored by the system, comprising a transmitter at one extremity of the region for sending an energy wave through the region, reflector means at another extremity of the region and arranged in the path of the wave and adapted to reflect the wave back through the region along substantially the same path traveled by the wave before reaching said reflector means, a receiver at one of said extremities of the region and adapted to receive the reflected wave, means associated with said reflector means for modulating at a constant frequency the energy wave impinging upon it to produce modulation energy within the reflected wave, and means associated with said receiver for measuring the intensity of only the modulation energy of the reflected wave.

2. A detecting system as defined in claim 1 including additional means associated with said reflector for amplifying the energy wave.

3. A system for detecting the entrance of an object into a region being monitored by the system, comprising a transmitter for sending an energy wave through the region, a target spaced from said transmitter and arranged in the path of the wave and adapted to reflect the wave back through the region, a receiver located at substantially the same point as said transmitter and adapted to receive the reflected wave, whereby said energy wave and said reflected wave are propagated along substantially the same path but in opposite directions, means associated with said target for modulating the energy wave at a constant frequency to produce modulation energy within the reflected wave, and means associated with said receiver for measuring only the modulation energy of the reflected wave.

4. A detecting system as defined in claim 3 including a signal device, and means responsive to said measuring means for actuating said signal device when the intensity of the measured wave changes from a predetermined value whereby said signal will be actuated whenever an object intercepts the wave and thereby changes its intensity at said receiving means.

5. A system for detecting the entrance of an object into a region being monitored by the system, comprising means for transmitting through the region an energy wave having a carrier frequency, said energy wave being of a type which is disturbed when intercepted by an object of the type sought to be detected, a target arranged in the path of the wave and adapted to reflect the wave back through the region, means associated with said target for modulating the wave to produce sideband frequencies within the reflected wave in addition to the carrier frequency, receiving means spaced from said target and adapted to receive the energy wave, means associated with said receiving means for mixing received energy at the sideband frequencies on only one side of the carrier frequency with energy at the carrier frequency of the energy wave in order to produce energy at frequencies corresponding to the modulation products produced by said mixing means, and means for measuring at least one of said products.

6. A detecting system as defined in claim 5 including means for transmitting a small predetermined portion of the output of said transmitting means to said mixing means.

7. A method of detecting the entrance of an object into a region being monitored, comprising the steps of transmitting an energy wave through the region, reflecting the wave back through the region along substantially the same path traveled by the transmitted wave, modulating the wave at a constant frequency at the time of reflection in order to produce modulation energy within the reflected wave, and measuring the intensity of only the modulation energy.

8. A system for detecting the entrance of an object into a region being monitored by the system, comprising a transmitter at one extremity of the region for sending an energy wave through the region, reflector means at another extremity of the region and arranged in the path of the wave and adapted to reflect the wave back through the region along substantially the same path traveled by the wave before reaching said reflector means, a receiver at one of said extremities of the region and adapted to receive the reflected wave, means for modulating the energy wave impinging upon it to produce modulation energy within the reflected wave, and means associated with said receiver for measuring the intensity of only the modulation energy of the reflected wave, said modulating means including means associated with said reflector for providing two conductive paths for the energy impinging upon said reflector, a diode for determining the path taken by the impinging energy, means for conducting the impinging energy to said diode, and means for continuously varying the impedance of said diode in order to direct the impinging energy along one conductive path or the other.

9. A system for detecting the entrance of an object into a region being monitored by the system, comprising a transmitter for sending an energy wave through the region, a target spaced from said transmitter and arranged in the path of the wave and adapted to reflect the wave back through the region, a receiver located at substantially the same point as said transmitter and adapted to receive the reflected wave, whereby said energy wave and said reflected wave are propagated along substantially the same path but in opposite directions, means associated with said target for modulating the energy wave to produce modulation energy within the reflected wave, means associated with said receiver for measuring only the modulation energy of the reflected wave, and reflector means arranged between the transmitter-receiver location and said target for altering the path of said energy wave and reflected wave.

References Cited by the Examiner

UNITED STATES PATENTS

| 2,038,878 | 4/1936 | Strutt | 343—5 |
| 2,197,028 | 4/1940 | Wolff | 343—5 |
| 2,247,246 | 6/1941 | Lindsay et al. | 340—258 |

FOREIGN PATENTS

| 130,490 | 3/1946 | Australia. |

OTHER REFERENCES

R. F. Heller: Versatile Microwave Components Electronics, vol. 36, No. 10, Mar. 8, 1963, pp. 40–43.

RODNEY D. BENNETT, *Primary Examiner.*

CHESTER L. JUSTUS, *Examiner.*

B. L. RIBANDO, *Assistant Examiner.*